(12) United States Patent
Nakagawa

(10) Patent No.: US 8,791,858 B2
(45) Date of Patent: Jul. 29, 2014

(54) PORTABLE TERMINAL DEVICE AND LOCATION RESULT ACQUISITION INTERVAL SETTING METHOD THEREOF

(75) Inventor: Takao Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 137 days.

(21) Appl. No.: 12/526,237

(22) PCT Filed: Feb. 6, 2008

(86) PCT No.: PCT/JP2008/051958
§ 371 (c)(1),
(2), (4) Date: Aug. 6, 2009

(87) PCT Pub. No.: WO2008/099736
PCT Pub. Date: Aug. 21, 2008

(65) Prior Publication Data
US 2010/0323754 A1    Dec. 23, 2010

(30) Foreign Application Priority Data
Feb. 7, 2007  (JP) ................................ 2007-028240

(51) Int. Cl.
*G01S 19/34*    (2010.01)
(52) U.S. Cl.
USPC .................................................... 342/357.74
(58) Field of Classification Search
CPC .................................................... H04W 64/00
USPC ............ 342/357.2–357.78; 455/566.1, 456.1; 701/93, 468
See application file for complete search history.

(56) References Cited

U.S. PATENT DOCUMENTS

| | | | | |
|---|---|---|---|---|
| 6,121,921 A * | 9/2000 | Ishigaki | ................... | 342/357.74 |
| 6,388,613 B1 * | 5/2002 | Nagatsuma et al. | ..... | 342/357.42 |
| 6,507,783 B2 * | 1/2003 | Katayama et al. | ............ | 701/431 |
| 6,559,794 B1 * | 5/2003 | Nakajima et al. | ........ | 342/357.31 |
| 7,353,034 B2 * | 4/2008 | Haney | ........................... | 455/457 |
| 7,375,682 B1 * | 5/2008 | Tester et al. | .............. | 342/357.63 |
| 7,460,064 B1 * | 12/2008 | Tester et al. | .............. | 342/357.51 |
| 2005/0037773 A1* | 2/2005 | Holland et al. | ............ | 455/456.1 |
| 2007/0213930 A1* | 9/2007 | Sakamoto et al. | ............ | 701/213 |

FOREIGN PATENT DOCUMENTS

| | | |
|---|---|---|
| JP | H10-206520 A | 8/1998 |
| JP | 2001-215268 A | 8/2001 |
| JP | 2002081958 | 3/2002 |
| JP | 2004-3877 A | 1/2004 |

(Continued)

OTHER PUBLICATIONS

International Search Report for PCT/JP2008/051958 mailed May 13, 2008.

(Continued)

*Primary Examiner* — Cassie Galt
(74) *Attorney, Agent, or Firm* — Sughrue Mion, PLLC

(57) ABSTRACT

Power consumption can be reduced in a portable terminal device that is equipped with a location means to locate the current position. A portable terminal device carried by a user includes: A location means that locates the current position of the portable terminal device; and a microprocessor that intermittently acquires the result of location from the location means, in which the microprocessor calculates the traveling speed of the portable terminal device based on the result of location done by the location means, and switches the time intervals at which the microprocessor acquires the result of location from the location means in accordance with the traveling speed so that when the result of calculation indicates a small speed, the time intervals become longer than when the result of calculation indicates a large speed.

5 Claims, 5 Drawing Sheets

| TRAVELING SPEED | ACCESS INTERVALS |
|---|---|
| GREATER THAN OR EQUAL TO FIRST TRAVELING SPEED | FIRST ACCESS INTERVALS |
| GREATER THAN OR EQUAL TO SECOND TRAVELING SPEED BUT LESS THAN FIRST TRAVELING SPEED | SECOND ACCESS INTERVALS |
| LESS THAN SECOND TRAVELING SPEED | THIRD ACCESS INTERVALS |

(56) References Cited

FOREIGN PATENT DOCUMENTS

| | | |
|---|---|---|
| JP | 2005337855 A | 12/2005 |
| JP | 2006060710 A | 3/2006 |
| JP | 2006215838 A | 8/2006 |
| JP | 2006242578 A | 9/2006 |
| JP | 2007006229 A | 1/2007 |
| WO | 2001020936 A | 3/2001 |

OTHER PUBLICATIONS

Japanese Office Action for JP Application No. 2008-558062 mailed on Aug. 16, 2013 with English Translation.

\* cited by examiner

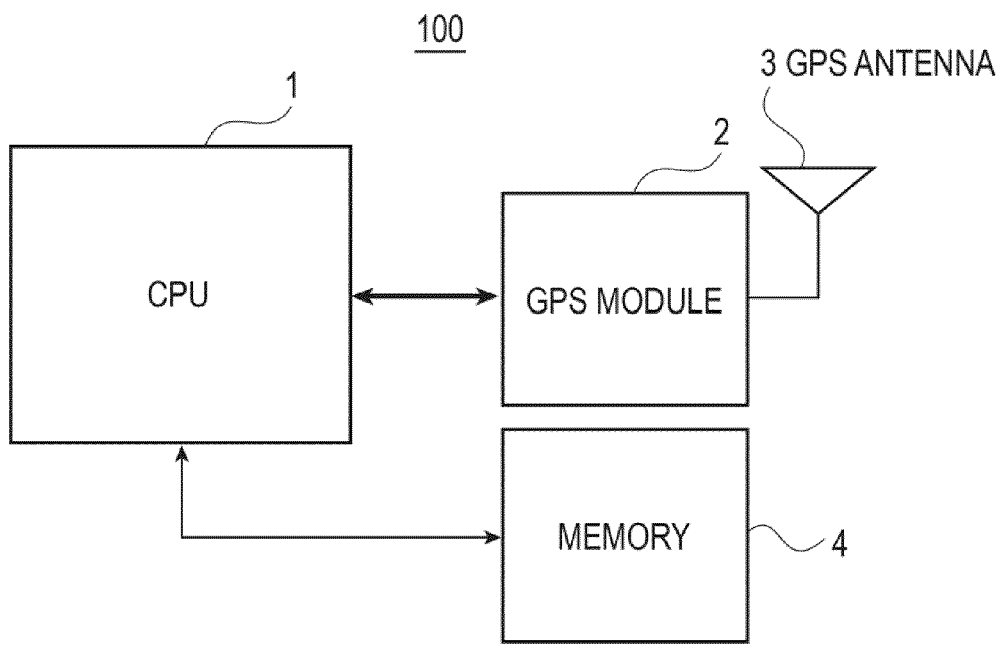

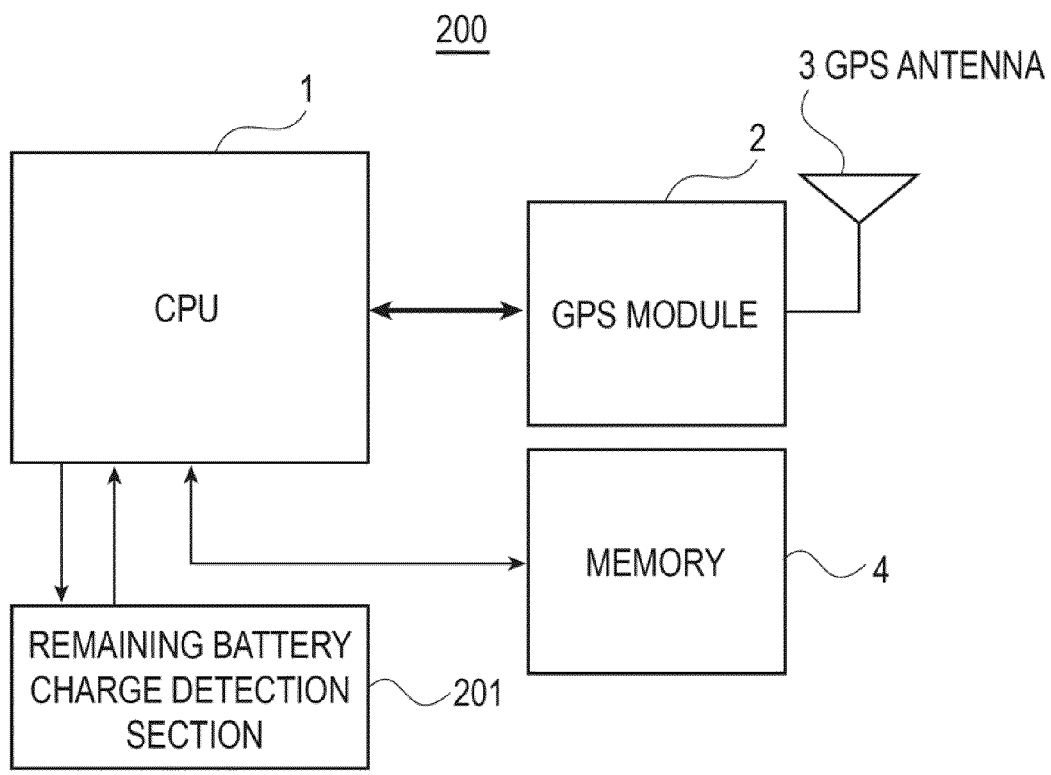

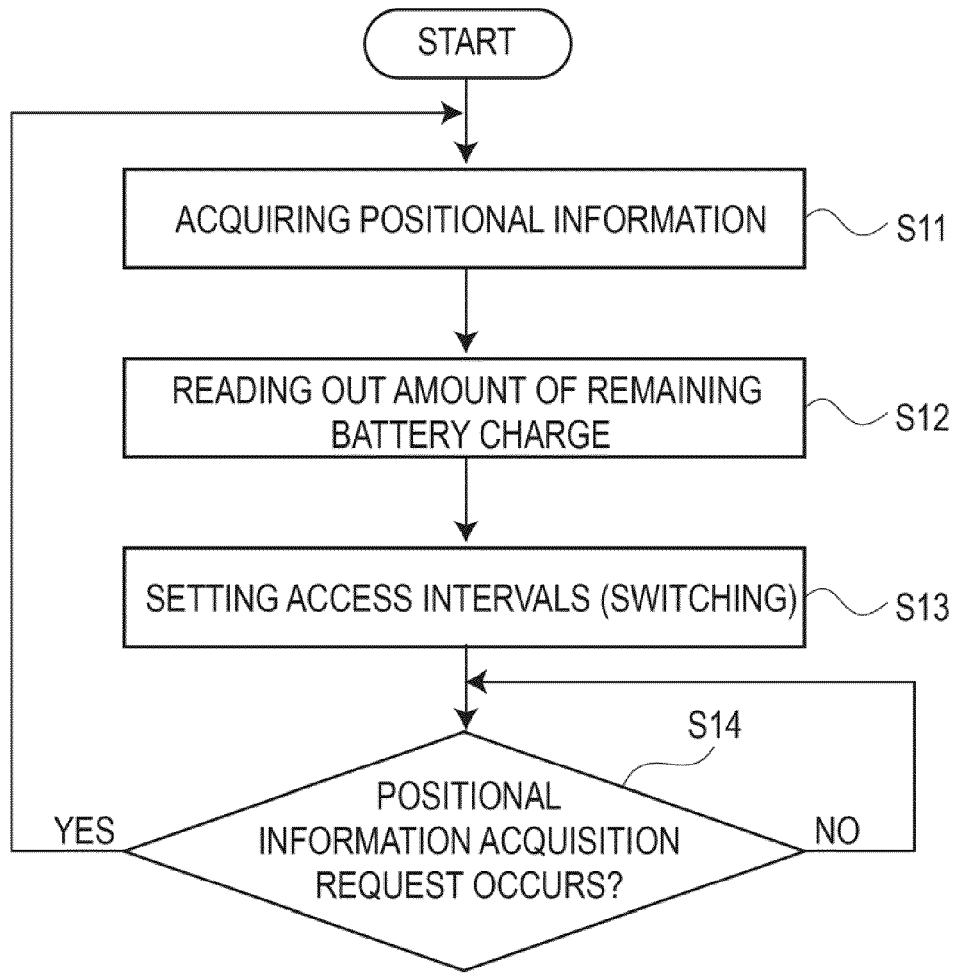

PORTABLE TERMINAL DEVICE AND LOCATION RESULT ACQUISITION INTERVAL SETTING METHOD THEREOF

TECHNICAL FIELD

The present invention relates to a portable terminal device and a location result acquisition interval setting method thereof.

BACKGROUND ART

In recent years, there are many portable phones equipped with GPS function. The GPS function allows the portable phones to acquire positional information.

When the GPS function of conventional portable phone is used, map information needs to be updated via a network (communication network) as the positional information that changes every moment. Therefore, a CPU of the portable phone periodically acquires the positional information from a GPS module.

Incidentally, in the portable phone, when the GPS function is used, the CPU needs to periodically access the GPS module to acquire the positional information that changes every moment. As a result, the operational rate of the CPU increases, leading to an increase in power consumption of the portable phone.

However, for example, the time intervals at which the CPU updates the map information are different between the low traveling speed such as walking transfer and the fast traveling speed such as a vehicle transfer. Acquiring the positional information at the same time intervals even when the traveling speed is low, may lead to a waste of power consumption.

Patent Literatures 1 to 3 describe conventional arts the objective of which is to reduce power consumption of a portable terminal device which is equipped with a location means to locate the current position.

Paragraph 40 of Patent Literature 1 describes a portable terminal device that locates the current position at predetermined intervals in a GPS method. Moreover, paragraph 49 of Patent Literature 1 explains that based on the traveling speed obtained as a result of GPS location, a determination is made as to whether a person is aboard a vehicle or not (walking or the like). Moreover, paragraph 55 of Patent Literature 1 explains that the GPS location comes to a halt when a person is aboard a vehicle.

Paragraph 31 of Patent Literature 2 describes a technique for stopping the location operation of the current position when the amount of remaining battery charge of a portable phone is less than or equal to a predetermined value.

Patent Literature 3 describes a positional information location system that includes a specifying means, which specifies a position that is a predetermined distance away from the current position of a terminal on a map and that is on a predetermined route along which the terminal travels as a position to be located next time; and a management means, which calculates the traveling time required for the terminal to move from the current position to the position to be located next time and stops the position location operation of the terminal during the traveling time.

CITATION LIST

{Patent Literature 1} JP-A-2006-242578
{Patent Literature 2} JP-A-2006-215838
{Patent Literature 3} JP-A-2005-337855

SUMMARY OF INVENTION

Technical Problem

However, according to the technique of Patent Literature 1, the GPS location comes to a halt when the traveling speed is fast (when a person is aboard a vehicle). Therefore, the problem is that the GPS location cannot be carried out when the GPS location is necessary.

Moreover, even with the technique of Patent Literature 2, the location operation of the current position stops when the amount of remaining battery charge is less than or equal to the predetermined value. Therefore, the problem is that the location operation cannot be carried out when the current position is necessary.

Moreover, according to The technique of Patent Literature 3, power consumption can be reduced only when a user is traveling along a predetermined route. The problem is that power consumption cannot be reduced in other cases.

The present invention is made to solve the above problems. The objective of the present invention is to reduce power consumption of a portable terminal device that is equipped with a location means to locate the current position, and to acquire the current position at certain time intervals every time the location means is booted.

Moreover, the objective of the present invention is to reduce power consumption of a portable terminal device that is equipped with a location means to locate the current position, not only when a user is traveling along a predetermined route but in other cases.

Solution to Problem

According to the present invention, provided is a portable terminal device that is carried by a user and includes a location means that locates the current position of the portable terminal device; and a microprocessor that intermittently acquires the result of location from the location means, in which the microprocessor calculates the traveling speed of the portable terminal device based on the result of location done by the location means, and switches the time intervals at which the microprocessor acquires the result of location from the location means in accordance with the traveling speed so that when the result of calculation indicates a small speed, the time intervals become longer than when the result of calculation indicates a large speed.

Moreover, according to the present invention, provided is a portable terminal device that is carried by a user and includes a location means that locates the current position of the portable terminal device; a microprocessor that intermittently acquires the result of location from the location means; a battery that serves as a power supply of the portable terminal device; and remaining battery charge detection means that detects the amount of remaining battery charge of the battery, in which the microprocessor switches the time intervals at which the microprocessor acquires the result of location from the location means in accordance with the amount of remaining battery charge so that when the result of detection done by the remaining battery charge detection means indicates a small amount, the time intervals become longer than when the result of detection indicates a large amount.

Furthermore, according to the present invention, provided is a portable terminal device that is carried by a user and includes a location means that locates the current position of the portable terminal device; and a microprocessor that intermittently acquires the result of location from the location means, in which the microprocessor switches the time intervals at which the microprocessor acquires the result of location from the location means in accordance with the attribute of the current position located by the location means.

Moreover, according to the present invention, provided is a location result acquisition interval setting method of a portable terminal device that is carried by a user and includes a location means that locates the current position and a microprocessor that intermittently acquires the result of location from the location means for setting the time intervals at which the microprocessor acquires the result of location from the location means. The method includes a first step of calculating the traveling speed of the portable terminal device based on the result of location done by the location means; and a second step of setting the time intervals at which the microprocessor acquires the result of location from the location means in accordance with the traveling speed so that when the result of calculation done by the first step indicates a small speed, the time intervals become longer than when the result of calculation indicates a large speed.

Moreover, according to the present invention, provided is a location result acquisition interval setting method of a portable terminal device that is carried by a user and includes a location means that locates the current position and a microprocessor that intermittently acquires the result of location from the location means for setting the time intervals at which the microprocessor acquires the result of location from the location means. The method includes a first step of detecting the amount of remaining battery charge of a battery that the portable terminal device has as a power supply; and a second step of setting the time intervals at which the microprocessor acquires the result of location from the location means in accordance with the amount of remaining battery charge so that when the result of detection done by the first step indicates a small amount, the time intervals become longer than when the result of detection indicates a large amount.

Moreover, according to the present invention, provided is a location result acquisition interval setting method of a portable terminal device that is carried by a user and includes a location means that locates the current position and a microprocessor that intermittently acquires the result of location from the location means for setting the time intervals at which the microprocessor acquires the result of location from the location means. The method includes a first step of determining the attribute of the current position of the portable terminal device based on the result of location done by the location means; and a second step of setting the time intervals at which the microprocessor acquires the result of location from the location means in accordance with the attribute determined by the first step.

Advantageous Effects of Invention

According to the present invention, power consumption can be reduced in a portable terminal device that is equipped with a location means to locate the current position. Moreover, every time the location means is booted, the current position can be acquired at certain time intervals.

Moreover, according to the present invention, in a portable terminal device that is equipped with location means to locate the current position, power consumption can be reduced not only when a user is traveling along a predetermined route but also in other cases.

BRIEF DESCRIPTION OF DRAWINGS

{FIG. 1} A block diagram illustrating the configuration of a portable phone according to a first embodiment of the present invention.

{FIG. 2} A diagram illustrating the access intervals corresponding to the traveling speed of the portable phone.

{FIG. 4} A block diagram illustrating the configuration of a portable phone according to a second embodiment of the present invention.

{FIG. 5} A diagram illustrating the access intervals corresponding to the amount of remaining battery charge of the portable phone.

{FIG. 6} A flowchart illustrating the operation of the portable phone according to the second embodiment of the present invention.

{FIG. 7} A diagram illustrating the access intervals corresponding to the current position of the portable phone.

DESCRIPTION OF EMBODIMENTS

Figure 3:
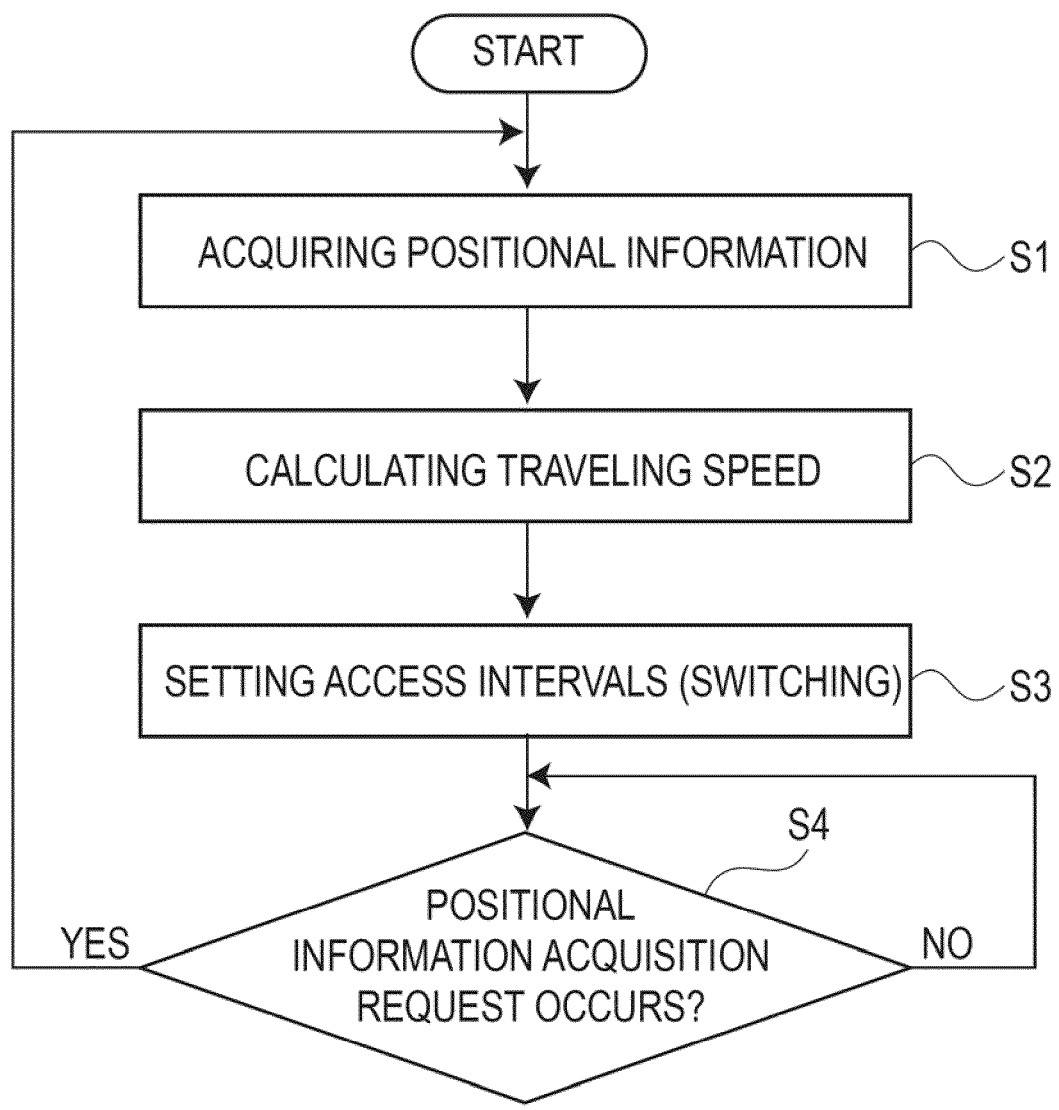
{FIG. 3} A flowchart illustrating the operation of the portable phone according to the first embodiment of the present invention.

Hereinafter, embodiments of the present invention will be described with reference to the accompanying drawings.

The present embodiments describe a portable phone as a preferred example of a portable terminal device of the present invention.

{First Embodiment}

FIG. 1 is a block diagram illustrating the major components of a portable phone (portable terminal device) 100 according to a first embodiment of the present invention.

As shown in FIG. 1, the portable phone 100 of the present embodiment includes a CPU (microprocessor) 1, which performs a variety of control operation; a GPS module (location means) 2, which controls the entire location process of the positional information which is carried out by GPS function; a GPS antenna 3, which receives an electric wave signal from a GPS satellite; and a memory (storage means) 4, which memorizes and retains a table or the like described below.

Moreover, although not shown in the drawing, other components that a typical portable phone has are provided in the portable phone 100. That is, the portable phone 100 includes a display device (a liquid crystal display, for example), which performs a variety of display operation; an operation section (including a plurality of operation keys and the like), which accepts a variety of operation done by a user; a speaker (which outputs the voice of a person on the other end of the line, or a ringing tone), which performs a variety of audio output operation; a microphone, which performs such processes as detecting the voice of a user who is making a call; an antenna, which exchanges wireless electric waves with a base station (when a call is being made, when email is being sent or received, when the portable phone 100 is being connected to the Internet, or in other cases); a wireless section, which performs wireless communication with the base station using the antenna; and a battery (which is a rechargeable secondary battery), which serves as a power supply for the portable phone 100. Incidentally, the CPU 1 controls the operation of the wireless section, the display device and the speaker among the above components. The CPU 1 performs a variety of control operation based on the detection result of the operation section.

FIG. 2 is a conceptual diagram illustrating a table memorized and kept in the memory 4 according to the first embodiment of the present invention.

As shown in FIG. 2, the memory 4 memorizes and retains the access intervals at which the CPU 1 accesses the GPS module 2 (the time intervals required for the CPU 1 to access the GPS module 2). The access intervals vary according to the traveling speed of the portable phone 100.

That is, for example, when the traveling speed of the portable phone 100 is greater than or equal to a first traveling speed, the access intervals are the first access intervals. When the traveling speed is greater than or equal to a second traveling speed but less than the first traveling speed, the access intervals are the second access intervals. When the traveling speed is less than the second traveling speed, the access intervals are the third access intervals.

Incidentally, the first traveling speed>the second traveling speed; the first access intervals<the second access intervals<the third access intervals.

That is, when the traveling speed of the portable phone 100 is small, the access intervals at which the CPU 1 accesses the GPS module is longer than when the traveling speed is large.

Moreover, the memory 4 memorizes and retains other kinds of data that the CPU 1 uses.

Moreover, in a similar way to a conventional, well-known typical GPS method, the GPS module 2 locates the current position in corporation with the GPS antenna 3.

That is, based on the electric wave signal received by the GPS antenna 3 from the GPS satellites, the GPS module 2 calculates (locates) the current position of the portable phone 100.

The GPS module 2, for example, locates the current position of the portable phone 100 at predetermined time intervals every time the GPS function is booted, and memorizes and retains the latest result of location.

Incidentally, the time intervals at which the GPS module 2 locates the current position of the portable phone 100 are shorter than the first access intervals of FIG. 2.

The CPU 1 intermittently acquires the result of location done by the GPS module 2. That is, the CPU 1 accesses the GPS module 2 at the set access intervals to acquire the latest location result (positional information) from the GPS module 2.

Moreover, every time the CPU 1 has acquired the positional information from the GPS module 2, the CPU 1 calculates the traveling speed of the portable phone 100 based on the acquired positional information.

That is, the CPU 1 calculates the traveling speed of the portable phone 100 by dividing the difference (distance) between the position represented by the previously acquired positional information and the position represented by the newly acquired positional information by the time that has elapsed since the previous positional information acquisition operation until the latest positional information acquisition operation.

Furthermore, the CPU 1 refers to the memory 4 to acquire the access intervals corresponding to the traveling speed of the portable phone 100, and replaces the previously set access intervals with the newly acquired access intervals.

Moreover, the CPU 1 makes a determination as to whether the current position represented by the positional information newly acquired from the GPS module 2 is away from the current position represented by the previously acquired positional information. If the current position represented by the newly acquired positional information is away from the current position represented by the previously acquired positional information, the CPU 1 automatically acquires via a communication network like the Internet the map information corresponding to the current position represented by the newly acquired positional information. Then, the CPU 1 replaces the previously used map information with the newly acquired map information. Therefore, the CPU 1, for example, can display on the display screen of the display device the latest positional information such that the latest positional information is associated with the corresponding map.

The following describes the operation of the portable phone 100 with reference to a flowchart of FIG. 3.

After the GPS function is booted by the operation of a user, the CPU 1 accesses the GPS module 2 to acquire the positional information from the GPS module 2, and saves the positional information in the memory 4 (step S1).

Then, the CPU 1 uses the previous positional information retained by the memory 4 and the latest positional information acquired at the above step S1 to calculate the traveling speed of the portable phone 100 (step S2).

That is, the CPU 1 calculates the traveling speed of the portable phone 100 by dividing the difference (distance) between the position represented by the previously acquired positional information and the position represented by the newly acquired positional information by the time that has elapsed since the previous positional information acquisition operation until the latest positional information acquisition operation.

Then, the CPU 1 refers to the table of the memory 4 to set the access intervals corresponding to the calculated traveling speed as the time intervals at which the CPU 1 accesses the GPS module 2 (step S3).

That is, when the calculated traveling speed is greater than or equal to the first traveling speed, the first access intervals are set. When the calculated traveling speed is greater than or equal to the second traveling speed but less than the first traveling speed, the second access intervals (>the first access intervals) are set. When the calculated traveling speed is less than the second traveling speed, the third access intervals (>the second access intervals) are set (switched).

Then, the CPU 1 waits until the next positional information acquisition request occurs. That is, the CPU 1 repeatedly makes the determination (as to whether the positional information acquisition request occurs) of step S4 until the next positional information acquisition request occurs after the access interval set at the above step S3 has passed.

After the next positional information acquisition request occurs ("Yes" at step S9), the CPU 1 proceeds to step S1, accesses the GPS module 2, acquires the positional information from the GPS module 2, and stores the positional information in the memory 4.

After that, the CPU 1 similarly performs the processes of step S2 and subsequent steps.

Incidentally, as described above, the CPU 1 also performs the update operation of the map information. That is, the CPU 1 makes a determination as to whether the current position represented by the positional information newly acquired from the GPS module 2 is away from the current position represented by the previously acquired positional information. If the current position represented by the newly acquired positional information is away from the current position represented by the previously acquired positional information, the CPU 1 automatically acquires the map information corresponding to the current position represented by the newly acquired positional information via the communication network such as the Internet. Although the operation is omitted in FIG. 3, the operation can be performed in parallel with the processes of step S2 and subsequent steps after step S1, for example.

According to the above-described first embodiment, the portable phone 100 includes the GPS module 2, which locates the current position of the portable phone 100; and the CPU 1, which intermittently acquires the result of location done by the GPS module 2. The CPU 1 calculates the traveling speed of the portable phone 100 based on the result of location done by the GPS module 2, and switches the time intervals in accordance with the calculated traveling speed so that when the result of calculation indicates a small speed, the time intervals (access intervals) at which the CPU 1 acquires the result of location from the GPS module 2 become longer than when the result of calculation indicates a large speed. Therefore, the operating current of the CPU 1 can be reduced when the traveling speed is slow and when it is not necessary for the CPU 1 to update the positional information frequently. Moreover, every time the GPS module 2 is booted, the CPU 1 can acquire the positional information at certain (finite) time intervals.

{Second Embodiment}

In the above example of the first embodiment, the access intervals are switched in accordance with the traveling speed of the portable phone. However, in the following example of a second embodiment of the present invention, the access intervals are switched in accordance with the amount of remaining battery charge of the portable phone.

FIG. 4 is a block diagram illustrating the major components of a portable phone (portable terminal device) 200 according to the second embodiment. Compared with the portable phone 100 in FIG. 1, only a remaining battery charge detection section 201 is added to the portable phone 200 in FIG. 4, and the other components are the same. Incidentally, the components shown in FIG. 4 are designated by the same reference numerals as the corresponding components shown in FIG. 1 are.

The following describes the difference between the above first embodiment and the second embodiment. The same components and operations as those of the first embodiment will not be described.

A remaining battery charge detection section (remaining battery charge detection means) 201 detects the amount of remaining battery charge (the amount of remaining battery charge) of the battery that the portable phone 200 has as a power source, for example, based on the output voltage of the battery.

The CPU 1 can readout the amount of remaining battery charge from the remaining battery charge detection section 201.

FIG. 5 is a conceptual diagram illustrating a table memorized and retained in the memory 4, according to the second embodiment.

As shown in FIG. 5, the memory 4 memorizes and retains the access intervals at which the CPU 1 accesses the GPS module 2. The access intervals vary according to the amount of remaining battery charge (the amount of remaining battery charge) of the battery of the portable phone 200.

That is, for example, when the amount of remaining battery charge of the portable phone 200 is greater than or equal to a first amount of remaining battery charge, the access intervals are the first access intervals. When the amount of remaining battery charge of the portable phone 200 is greater than or equal to a second amount of remaining battery charge but less than the first amount of remaining battery charge, the access intervals are the second access intervals. When the amount of remaining battery charge of the portable phone 200 is less than the second amount of remaining battery charge, the access intervals are the third access intervals.

Incidentally, the first amount of remaining battery charge>the second amount of remaining battery charge; the first access intervals<the second access intervals<the third access intervals.

That is, when the amount of remaining battery charge of the battery of the portable phone 200 is a small amount of remaining battery charge, the access intervals at which the CPU 1 accesses the GPS module is longer than when the amount of remaining battery charge is a large amount of remaining battery charge.

According to the present embodiment, the CPU 1 does not have to calculate the traveling speed of the portable phone 200.

According to the present embodiment, the CPU 1 refers to the memory 4 to acquire the access intervals corresponding to the amount of remaining battery charge of the battery of the portable phone 200, and replaces the previously set access intervals with the newly acquired access intervals.

The following describes the operation of the portable phone 200 with Reference to a flowchart of FIG. 6.

After the GPS function is booted by the operation of a user, the CPU 1 accesses the GPS module 2 to acquire the positional information from the GPS module 2, and saves the positional information in the memory 4 (step S11).

Then, the CPU 1 reads out the amount of remaining battery charge from the remaining battery charge detection section 201 (step S12).

Then, the CPU 1 refers to the table of the memory 4 to set the access intervals corresponding to the amount of remaining battery charge read out at the above step S12 as the time intervals at which the CPU 1 accesses the GPS module 2 (step S13).

That is, when the read-out amount of remaining battery charge is greater than or equal to the first amount of remaining battery charge, the first access intervals are set. When the read-out amount of remaining battery charge is greater than or equal to the second amount of remaining battery charge but less than the first amount of remaining battery charge, the second access intervals (>the first access intervals) are set. When the read-out amount of remaining battery charge is less than the second amount of remaining battery charge, the third access intervals (>the second access intervals) are set (switched).

Then, the CPU 1 waits until the next positional information acquisition request occurs. That is, the CPU 1 repeatedly makes the determination (as to whether the positional information acquisition request occurs) of step S14 until the next positional information acquisition request occurs after the access interval set at the above step S13 has passed.

After the next positional information acquisition request occurs ("Yes" at step S14), the CPU 1 proceeds to step S11, accesses the GPS module 2; acquires the positional information from the GPS module 2, and stores the positional information in the memory 4.

After that, the CPU 1 similarly performs the processes of step S12 and subsequent steps.

Incidentally, as described above in the first embodiment, the CPU 1 also performs the update operation of the map information. Even though the operation is omitted in FIG. 6, the operation can be performed in parallel with the processes of step S12 and subsequent steps after step S11, for example.

According to the above-described second embodiment, the portable phone 200 includes the GPS module 2, which locates the current position of the portable phone 200; the CPU 1, which intermittently acquires the result of location done by the GPS module 2; the battery (not shown in the diagrams), which serves as the power supply of the portable phone 200; and the remaining battery charge detection section 201, which detects the amount of remaining battery charge of the battery. The CPU 1 switches the time intervals in accordance with the amount of remaining battery charge so that when the result of detection done by the remaining battery charge detection section 201 indicates a small amount, the time intervals (access intervals) at which the CPU 1 acquires the result of location from the GPS module 2 become longer than when the result of detection indicates a large amount. Therefore, the operating current of the CPU 1 can be reduced when the amount of remaining battery charge is small. Moreover, every time the GPS module 2 is booted, the CPU 1 can acquire the positional information at certain (finite) time intervals.

{Third Embodiment}

In the above example of the first embodiment, the access intervals are switched in accordance with the traveling speed of the portable phone. However, in the following example of a third embodiment of the present invention, the access intervals are switched in accordance with the attribute (characteristics and properties) of the current position of the portable phone:

The basic configuration of the portable phone 100 of the third embodiment is the same as that of the first embodiment as shown in FIG. 1.

The following describes the difference between the above first embodiment and the third embodiment. The same components and operations as those of the first embodiment will not be described.

FIG. 7 is a conceptual diagram illustrating a table memorized and kept in the memory 4, according to the third embodiment.

As shown in FIG. 7, the memory 4 memorizes and retains the access intervals at which the CPU 1 accesses the GPS module 2. The access intervals vary according to the attribute of the current position of the portable phone 100.

That is, for example, when the current position of the portable phone 100 is around a railway station (a user is expected to move frequently and a longer distance), the access intervals are the first access intervals. When the current position of the portable phone 100 is around the user's house or office (the user is expected to move less frequently and a shorter distance), the access intervals are the third access intervals. When the current position of the portable phone 100 is not around the railway station, the user's house or office (the user is expected to move a little frequently and a little longer distance, or it is impossible to predict), the access intervals are the second access intervals.

Incidentally, the first access intervals<the second access intervals<the third access intervals.

That is, when the current position of the portable phone 100 is around the user's house or office, the access intervals get longer. On the other hand, when the current position of the portable phone 100 is around the railway station or a bus stop, the access intervals get shorter.

Incidentally, for example, by performing a predetermined operation, the user previously registers the location of the user's house or office in the portable phone 100. The result of registration is memorized and kept in the memory 4.

Furthermore, other kinds of data that the CPU 1 uses are memorized and kept in the memory 4.

Incidentally, according to the present embodiment, the CPU 1 does not have to calculate the traveling speed of the portable phone 100.

According to the present embodiment, the CPU 1 refers to the memory 4 to acquire the access intervals corresponding to the current position of the portable phone 100 (the attribute of the current position of the portable phone 100), and replaces the previously set access intervals with the newly acquired access intervals.

Figure 8:
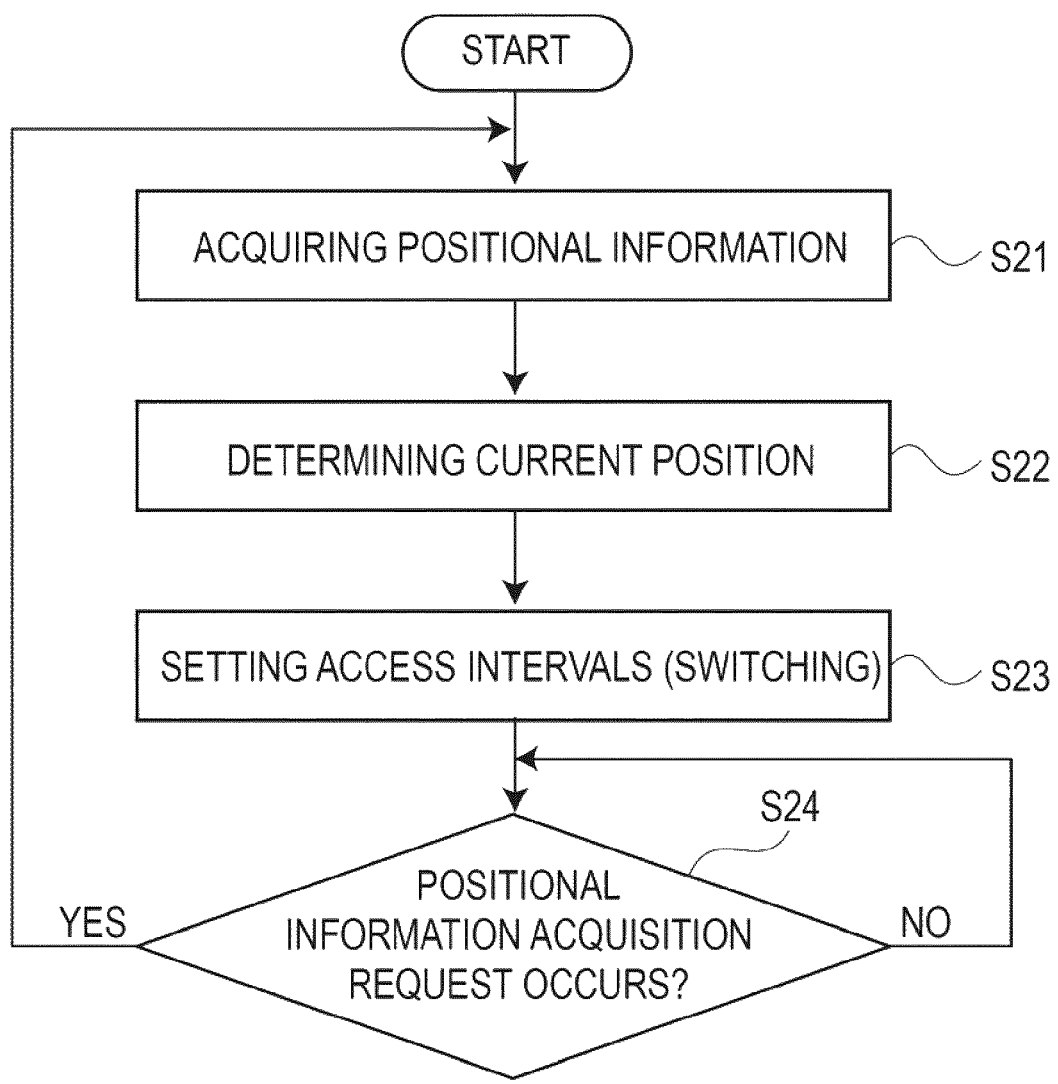
{FIG. 8} A flowchart illustrating the operation of the portable phone according to a third embodiment of the present invention.

The following describes the operation of the portable phone 100 with reference to a flowchart of FIG. 8.

After the GPS function is booted by the operation of a user, the CPU 1 accesses the GPS module 2 to acquire the positional information from the GPS module 2, and saves the positional information in the memory 4 (step S21).

Then, the CPU 1 determines the current position of the portable phone 100 (for example, whether the current position is around the user's house, the user's office, the railway station, or the bus stop) (step S22).

Then, the CPU 1 refers to the table of the memory 4 to set the access intervals corresponding to the current position determined at the above step S22 as the time intervals at which the CPU 1 accesses the GPS module 2 (step S23).

That is, when the current position of the portable phone 100 is around the railway station or the bus stop, the first access intervals are set. When the current position of the portable phone 100 is around the user's house or office, the third access intervals (>the second access intervals) are set. When the current position of the portable phone 100 is not around the railway station, the bus stop, or the user's house or office, the second access intervals (>the first access intervals) are set (switched).

Then, the CPU 1 waits until the next positional information acquisition request occurs. That is, the CPU 1 repeatedly makes the determination (as to whether the positional information acquisition request occurs) of step S24 until the next positional information acquisition request occurs after the access interval set at the above step S23 has passed.

After the next positional information acquisition request occurs ("Yes" at step S24), the CPU 1 proceeds to step S21, accesses the GPS module 2, acquires the positional information from the GPS module 2, and stores the positional information in the memory 4.

After that, the CPU 1 similarly performs the processes of step S22 and subsequent steps.

Incidentally, as described above in the first embodiment, the CPU 1 also performs the update operation of the map information. Even though the operation is omitted in FIG. 6, the operation can be performed in parallel with the processes of step S22 and subsequent steps after step S21, for example.

According to the above-described third embodiment, the portable phone 100 includes the GPS module 2, which locates the current position of the portable phone 100; and the CPU 1, which intermittently acquires the result of location done by the GPS module 2. The CPU 1 switches the time intervals at which the CPU 1 acquires the result of location from the GPS module 2 in accordance with the attribute of the current position located by the GPS module 2. Therefore, the CPU 1 can acquire the result of location from the GPS module 2 at appropriate time intervals corresponding to the attribute of the current position of the portable phone 100. For example, if the user is expected to move less frequently and a shorter distance because the position is around the user's house or office, the operating current of the CPU 1 can be reduced. Moreover, every time the GPS module 2 is booted, the CPU 1 can acquire the positional information at certain (finite) time intervals. Furthermore, power consumption can be reduced even when the user does not move along a predetermined route.

Incidentally, in the above-described embodiments, the portable phone is described as an example of the portable terminal device. However, the present invention can be also applied to, for example, PHS (Personal Handy Phone System), PDA (Personal Digital Assistance) and other portable terminal devices.

Moreover, in the above-described embodiments, a GPS method is used to locate the current position of the portable terminal device (portable phone). However, other methods may be used to locate the current position. Specifically, for example, based on the positional information of a plurality of base stations which exist around the portable terminal device, the current position of the portable terminal device may be calculated. Alternatively, based on the detection result of an acceleration sensor, the current position of the portable terminal device may be continuously calculated.

Moreover, in the above-described embodiments, the microprocessor is a CPU (Central Processing Unit). However, the microprocessor may be, for example, a DSP (Digital Signal Processor) or the like instead of the CPU.

Moreover, in the above-described embodiments, the location means (for example, the GPS module 2) locates the current position of the portable terminal device at constant time intervals every time the location means is booted, and, when accepting an acquisition request of the location result from the microprocessor (for example, the CPU 1), outputs the latest location result to the microprocessor. However, the present invention is not limited to this. For example, it is also desirable that when accepting the acquisition request of the location result from the microprocessor, the location means (the GPS module 2 and the like) locate the current position of the portable terminal device and output the location result to the microprocessor. In the latter case, power consumption is more reduced than in the former case because the operating frequency of the location means can be reduced.

Furthermore, in the first and second embodiments, the microprocessor (for example, the CPU 1) refers to the table shown in FIG. 2 (the first embodiment) or the table shown in FIG. 5 (the second embodiment) to recognize the required access intervals. However, without using such a table, the microprocessor (for example, the CPU 1) may perform predetermined calculation to recognize the required access intervals.

That is, for example, in the case of the first embodiment, following a program for calculating the access intervals corresponding to the traveling speed, the microprocessor (for example, the CPU 1) may perform calculation to recognize the required access intervals like those shown in FIG. 2, and set (switch) the access intervals.

Moreover, in the case of the second embodiment, following a program for calculating the access intervals corresponding to the amount of remaining battery charge, the microprocessor (for example, the CPU 1) may perform calculation to recognize the required access intervals like those shown in FIG. 5, and set (switch) the access intervals.

The present application is the National Phase of PCT/JP2008/051958, filed Feb. 6, 2008, which is based on and claims priority from Japanese Patent Application No. 2007-028240 filed on Feb. 7, 2007, the entire content of which being incorporated herein by reference.

While representative embodiments of the present invention have been described in detail above, various changes, substitutions, and alternatives may be made without departing from the spirit and scope of the invention as defined by the appended claims. Moreover, even if the claims are changed at the time of filing the application, the inventor intends that the scope of the appended claims or the equivalents thereof is maintained.

Industrial Applicability

The present invention can be used for locating the current position of the portable terminal device.

Reference Signs List

100: Portable terminal device (portable phone)
1: CPU (microprocessor)
2: GPS module (location means)
4: Memory (storage means)
200: Portable terminal device (portable phone)
201: Remaining battery charge detection section (remaining battery charge detection means)

The invention claimed is:

1. A portable terminal device comprising:
a location unit configured to repeatedly locate a current position of the portable terminal device;
a microprocessor configured to intermittently access the location unit to acquire positional information of the portable terminal device from the location unit at access intervals; and
a memory configured to store information on corresponding relationship between the access intervals and traveling speeds of the portable terminal device carried by a user,
wherein the microprocessor is further configured to calculate a traveling speed of the portable terminal device based on the acquired positional information, obtain the access intervals corresponding to the calculated traveling speed by referring to the stored information on corresponding relationship, and switch the access intervals to the obtained access intervals so that the access intervals become longer stepwise as the traveling speed lowers, and
wherein when the current position represented by the positional information newly acquired from the location unit is away from a previous position represented by the previously acquired positional information, the microprocessor is further configured to acquire map information corresponding to the current position represented by the newly acquired positional information via a communication network and display on a screen the current position in the corresponding map, and
wherein the location unit is configured to constantly locate the current position of the portable terminal device at constant time intervals that are shorter than a minimum access interval stored in the memory, and, when accepting an acquisition request of the location result from the microprocessor, to output the latest location result to the microprocessor.

2. The portable terminal device according to claim 1, wherein the microprocessor calculates the traveling speed of the portable terminal device every time the microprocessor acquires the positional information from the location unit.

3. The portable terminal device according to claim 1, wherein the location unit locates the current position of the portable terminal device in a GPS method.

4. The portable terminal device according to claim 1, wherein the portable terminal device is a portable phone.

5. A location result acquisition interval switching method of a portable terminal device that includes (a) a location unit that repeatedly locates the current position of the portable terminal device, (b) a microprocessor that intermittently accesses the location unit to acquire positional information of the portable terminal device from the location unit at access intervals, and (c) a memory that stores information on corresponding relationship between the access intervals and traveling speeds of the portable terminal device carried by a user, the method comprising steps of:
calculating a traveling speed of the portable terminal device based on the acquired positional information;
obtaining the access intervals corresponding to the calculated traveling speed by referring to the stored information on corresponding relationship;
switching the access intervals to the obtained access intervals so that the access intervals become longer stepwise as the traveling speed lowers; and when the current position represented by the positional information newly acquired from the location unit is away from a previous position represented by the previously acquired positional information, acquiring map information corresponding to the current position represented by the newly acquired positional information via a communication network, and displaying on a screen the current position in the corresponding map, and wherein the method further comprises:

the location unit constantly locating the current position of the portable terminal device at constant time intervals that are shorter than a minimum access interval stored in the memory, and, when accepting an acquisition request of the location result from the microprocessor, outputting the latest location result to the microprocessor.

* * * * *

UNITED STATES PATENT AND TRADEMARK OFFICE
CERTIFICATE OF CORRECTION

| | | |
|---|---|---|
| PATENT NO. | : 8,791,858 B2 | Page 1 of 1 |
| APPLICATION NO. | : 12/526237 | |
| DATED | : July 29, 2014 | |
| INVENTOR(S) | : Takao Nakagawa | |

It is certified that error appears in the above-identified patent and that said Letters Patent is hereby corrected as shown below:

In the Specification

Column 6, Line 41: Delete "S9)," and insert -- S4), -- .

Column 11, Line 43: Delete "The present application is the National Phase of PCT/JP2008/051958, filed Feb. 6, 2008, which is based on and claims priority from Japanese Patent Application No. 2007-028240 filed on Feb. 7, 2007, the entire content of which being incorporated herein by reference." and insert the same on Col. 1, line 4, below Title.

Signed and Sealed this
Third Day of March, 2015

Michelle K. Lee
*Deputy Director of the United States Patent and Trademark Office*